(12) United States Patent
Lim

(10) Patent No.: US 12,049,212 B2
(45) Date of Patent: Jul. 30, 2024

(54) ELECTRO-MECHANICAL BRAKE

(71) Applicant: HYUNDAI MOBIS CO., LTD., Seoul (KR)

(72) Inventor: Dong Hwan Lim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 235 days.

(21) Appl. No.: 17/893,529

(22) Filed: Aug. 23, 2022

(65) Prior Publication Data

US 2023/0077118 A1    Mar. 9, 2023

(30) Foreign Application Priority Data

Sep. 8, 2021    (KR) .................. 10-2021-0119721

(51) Int. Cl.
| | |
|---|---|
| *B60T 8/172* | (2006.01) |
| *B60T 8/171* | (2006.01) |
| *B60T 17/22* | (2006.01) |
| *B60T 1/06* | (2006.01) |
| *B60T 13/74* | (2006.01) |

(52) U.S. Cl.
CPC .............. *B60T 8/172* (2013.01); *B60T 8/171* (2013.01); *B60T 17/22* (2013.01); *B60T 1/065* (2013.01); *B60T 13/746* (2013.01)

(58) Field of Classification Search
CPC .......... B60T 8/172; B60T 8/171; B60T 17/22; B60T 1/065; B60T 13/746
See application file for complete search history.

(56) References Cited

U.S. PATENT DOCUMENTS

2016/0200298 A1    7/2016  Saito

FOREIGN PATENT DOCUMENTS

| DE | 102018005706 A1 | 1/2020 |
|---|---|---|
| JP | 5962609 B2 | 8/2016 |
| JP | 2021-030876 A | 3/2021 |

OTHER PUBLICATIONS

Kawahara (Year: 2006).*

* cited by examiner

*Primary Examiner* — George C Jin
(74) *Attorney, Agent, or Firm* — Morgan, Lewis & Bockius LLP

(57) ABSTRACT

An electro-mechanical brake configured such that a piston pulls a brake pad toward a wheel disc by driving a motor is disclosed. The electro-mechanical brake comprising: a hysteresis data storage unit storing rising-section function data on a rising section in which braking force increases as the piston moves toward the wheel disc, and falling-section function data on a falling section in which the braking force decreases as the piston moves away from the wheel disc; a position detection unit detecting a position of the piston; a calculation unit calculating a differential value of the position of the piston with respect to time; a past state data storage unit storing data on a preceding section corresponding to a preceding piston position; and a braking force calculation unit calculating the braking force based on the differential value of the piston position and the data on the preceding section.

5 Claims, 10 Drawing Sheets

ELECTRO-MECHANICAL BRAKE

CROSS-REFERENCE TO RELATED APPLICATION

This application claims priority to and the benefit of Korean Patent Application No. 10-2021-0119721 filed on Sep. 8, 2021, the disclosure of which is incorporated herein by reference in its entirety.

TECHNICAL FIELD

The present disclosure relates to an electro-mechanical brake.

BACKGROUND

The content described in this section merely provides the background information on the present disclosure and does not constitute the prior art.

An Electro-Mechanical Brake (EMB) is being widely used. The electro-mechanical brake was developed as an Electronic Parking Brake (EPB), but the field of use of the brake is expanding to a main brake which substitutes for a conventional hydraulic brake. The EMB is a device in which an actuator driven by a motor is mounted on a brake caliper, so that a vehicle is directly braked by a motor driving force without a medium such as brake fluid. Since the EMB has a mechanism similar to that of the Electronic Parking Brake (EPB) but is mainly used for main braking unlike the EPB, the EMB requires higher braking response and operation durability than those of the EPB. Further, the electro-mechanical brake may be simpler in structure, be higher in braking response speed, and be more precisely controlled compared to the hydraulic brake, thereby improving braking stability.

The EMB equipped with a load sensor may accurately measure a clamping force. However, if the EMB is equipped with the load sensor, the design of a component where the sensor is mounted becomes complicated, and manufacturing cost thereof increases. Furthermore, the size of the EMB due to the sensor mounting may be inevitably increased.

In order to prevent an increase in manufacturing cost and an increase in size of the EMB, the clamping force may be estimated using a current sensor instead of the load sensor. The EMB may be designed such that the current sensor measures current flowing through a motor generating a braking force and the clamping force is estimated based on the measured current value. However, a method of estimating the clamping force by measuring the current flowing through the motor is problematic in that estimation accuracy is deteriorated compared to the case of using the load sensor, due to the measurement noise of the current sensor.

FIGS. 11A, 11B and 11C are schematic views illustrating the configuration of a conventional electro-mechanical brake.

Referring to FIGS. 11A, 11B and 11C, the EMB includes a wheel disc $11\_c$, a pair of brake pads $11\_b$ disposed on both sides of the wheel disc $11\_c$, and a piston $11\_a$ configured to press the brake pads $11\_b$ toward the wheel disc $11\_c$. As the piston $11\_a$ moves toward the wheel disc $11\_c$, the braking force is increased. Even if the relative positions of the piston $11\_a$ and the brake pad $11\_b$ are the same, the braking force has a different value depending on the moving path of the piston $11\_a$. That is, the braking force for the position of the piston $11\_a$ has hysteresis characteristics. Therefore, if the moving path of the piston $11\_a$ is not considered, the braking force of the EMB cannot be accurately estimated.

SUMMARY

In view of the above, an electro-mechanical brake according to an embodiment can estimate a clamping force with high accuracy by estimating the clamping force based on the position of a piston where a specific current value is detected.

An electro-mechanical brake according to an embodiment can more accurately calculate a braking force, by calculating the braking force in consideration of the hysteresis characteristics of the braking force for the position of a piston, so as to control the electro-mechanical brake using the calculated braking force.

The problems to be solved by the present disclosure are not limited to the above-mentioned problems, and other problems which are not mentioned will be clearly understood by those skilled in the art from the following description.

According to at least one embodiment, the present disclosure provides an electro-mechanical brake configured such that a piston pulls a brake pad toward a wheel disc by driving a motor, the electro-mechanical brake comprising: a hysteresis data storage unit storing rising-section function data on a rising section in which braking force increases as the piston moves toward the wheel disc, and falling-section function data on a falling section in which the braking force decreases as the piston moves away from the wheel disc; a position detection unit detecting a position of the piston; a calculation unit calculating a differential value of the position of the piston with respect to time; a past state data storage unit storing data on a preceding section corresponding to a preceding piston position; and a braking force calculation unit calculating the braking force based on the differential value of the piston position and the data on the preceding section.

According to an embodiment, an electro-mechanical brake is advantageous in that it can estimate a clamping force with high accuracy by estimating the clamping force based on the position of a piston where a specific current value is detected.

According to an embodiment, an electro-mechanical brake is advantageous in that it can more accurately calculate a braking force, by calculating the braking force in consideration of the hysteresis characteristics of the braking force for the position of a piston.

DETAILED DESCRIPTION

Figure 1:
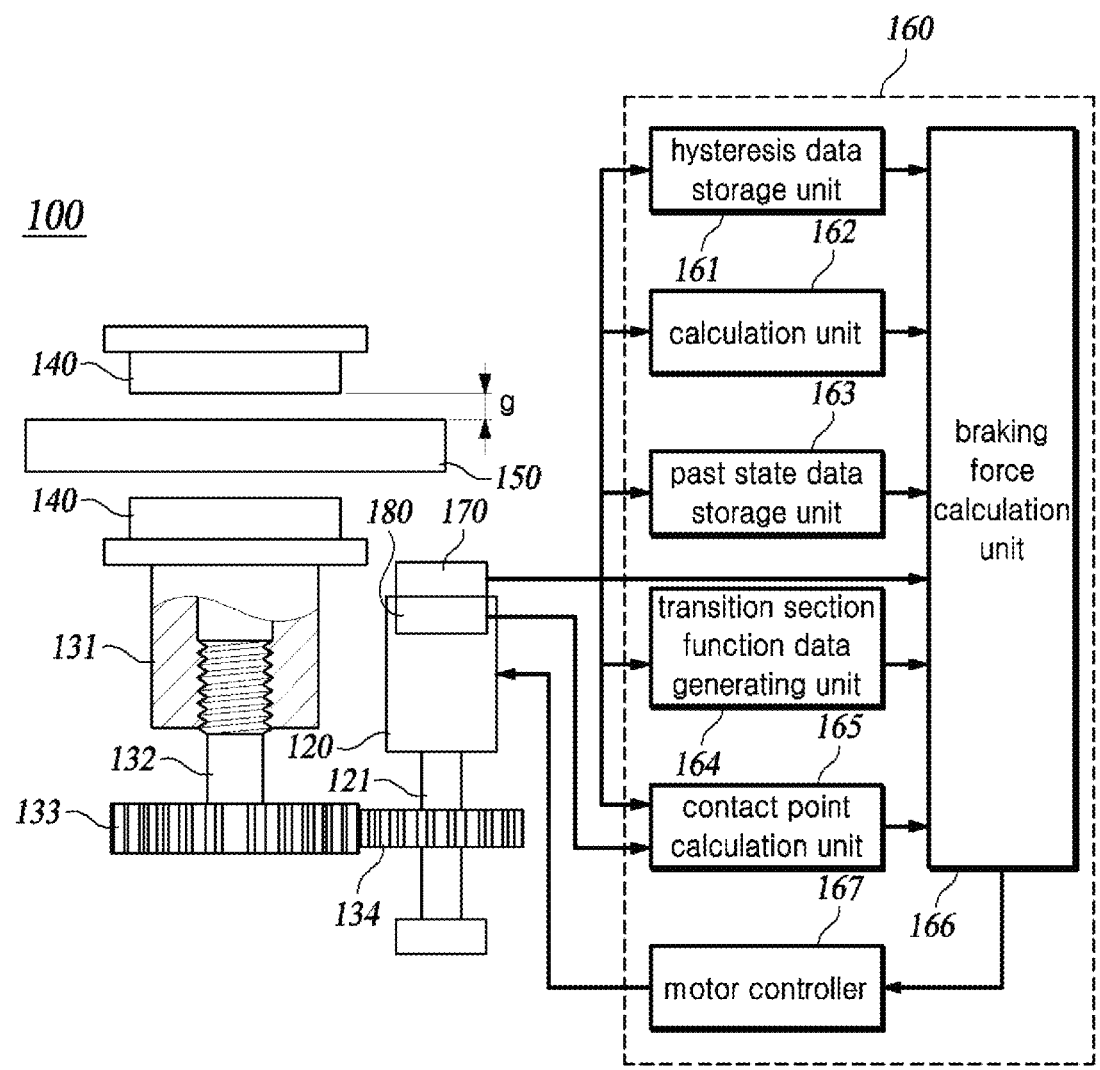
FIG. 1 is a schematic view illustrating the configuration of an electro-mechanical brake according to an embodiment of the present disclosure.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is a schematic view illustrating the configuration of an electro-mechanical brake according to an embodiment of the present disclosure.

Referring to FIG. 1, the electro-mechanical brake according to an embodiment of the present disclosure includes all or some of a wheel disc 150, a brake pad 140, a piston 131, a motor 120, a current detection unit 180, a position detection unit 170, and a control unit 160.

The wheel disc 150 is coupled to a wheel of a vehicle. The wheel disc 150 is rotated along with the wheel of the vehicle. By restricting the rotation of the wheel disc 150, the vehicle may be braked. The brake pad 140 is disposed on a side of the wheel disc 150. The piston 131 is configured to push the brake pad 140 toward the wheel disc 150 by driving the motor 120. As the piston 131 presses the brake pad 140 toward the wheel disc 150, a frictional force is generated between the brake pad 140 and the wheel disc 150. Due to the frictional force generated between the brake pad 140 and the wheel disc 150, the rotation of the wheel disc 150 is restricted. The motor 120 supplies power to the piston 131.

A process in which the piston 131 receives power from the motor 120 and then is driven will be described. A driving gear 134 is rotated along with a rotating shaft 121 of the motor 120 by driving the motor 120. The driving gear 134 engages with a driven gear 133. When the driving gear 134 rotates, the driven gear 133 is also rotated. The driven gear 133 is coupled to a screw shaft 132. The screw shaft 132 rotates in conjunction with the rotation of the driven gear 133. A screw thread is formed on the outer circumference of the screw shaft 132. A screw groove having a shape corresponding to that of the screw thread of the screw shaft 132 is formed on the inner circumference of the piston 131. If the screw shaft 132 is rotated along with the driven gear 133, the piston 131 moves rectilinearly while being fastened to or unfastened from the screw shaft 132. If the piston 131 moves rectilinearly toward the wheel disc 150, the brake pad 140 is pushed toward the wheel disc 150 by the piston 131.

The position detection unit 170 detects the position of the piston 131. The position of the piston 131 represents a distance from a lowest point of a stroke of the piston 131 to the piston 131. Here, the stroke lowest point refers to the position of the brake pad 140 when the brake pad 140 is maximally spaced apart from the wheel disc 150.

The position detection unit 170 may include an angle sensor. The angle sensor measures the angular displacement of the rotating shaft 121 of the motor 120. The position detection unit 170 may calculate the rectilinear moving distance of the piston 131 using the angular displacement of the rotating shaft 21 sensed by the angle sensor. The rectilinear moving distance of the piston 131 according to the rotating angle of the motor 120 may vary depending on the design of the electro-mechanical brake. For instance, the electro-mechanical brake may be designed such that the rectilinear moving distance of the piston 131 is 1 mm while the rotating shaft 121 of the motor 120 is rotated at 360 degrees.

Figure 2A:
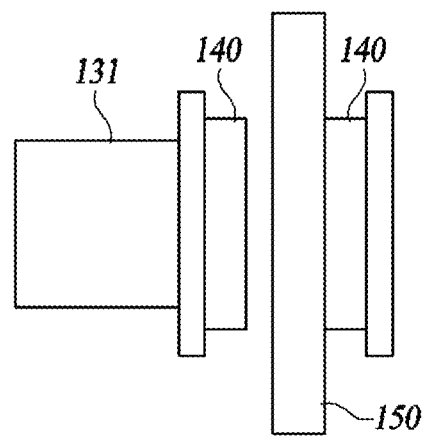
FIGS. 2A, 2B and 2C are diagrams illustrating the driving state of the electro-mechanical brake according to an embodiment of the present disclosure.
Figure 2B:
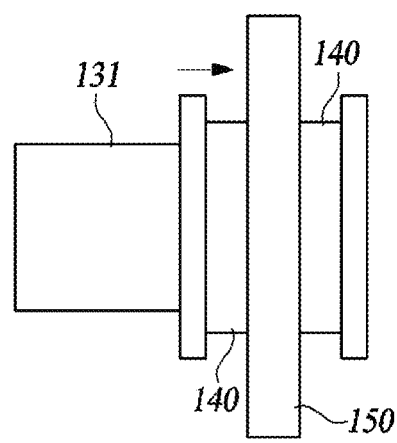
Figure 2C:
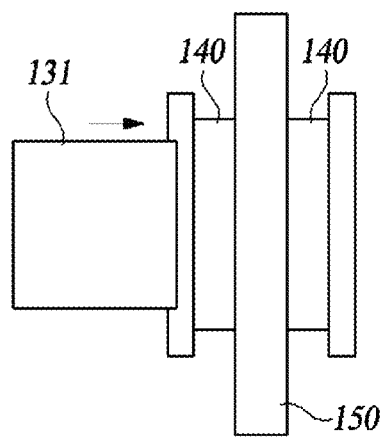

FIGS. 2A, 2B and 2C are diagrams illustrating the driving state of the electro-mechanical brake according to an embodiment of the present disclosure.

Referring to FIG. 2A, when the brake pad 140 is spaced apart from the wheel disc 150, no braking force is generated. Here, the braking force is the force for braking the vehicle. When the piston 131 pushes the brake pad 140 so that the brake pad 140 contacts the wheel disc 150 as shown in FIG. 2B, frictional force is generated between the brake pad 140 and the wheel disc 150. The frictional force generated between the brake pad 140 and the wheel disc 150 acts as the braking force. The position of the piston 131 where the brake pad 140 starts to contact the wheel disc 150 is referred to as a contact point. As shown in FIG. 2C, when the piston 131 passes through the contact point and moves toward the wheel disc 150, the force of the piston 131 pressing the brake pad 140 is increased. Here, the force of the piston 131 pressing the brake pad 140 is referred to as clamping force. If the clamping force increases, the frictional force generated between the brake pad 140 and the wheel disc 150 increases. That is, the braking force increases.

The electro-mechanical brake according to an embodiment of the present disclosure may estimate the clamping force not by using a load sensor but by using a current sensor and a position sensor.

The position detection unit 170 may precisely measure the position of the piston 131 using the angle sensor. However, since the contact point varies depending on the wear state of the brake pad 140, the position of the contact point cannot be recognized only by the position of the piston 131. If the contact point is not recognized, it is difficult to precisely estimate the clamping force according to the position of the piston 131.

The current detection unit 180 detects the value of current flowing through the motor 120. The control unit 160 feeds back the current value detected by the current detection unit 180 to control the motor 120. The electro-mechanical brake device according to an embodiment of the present disclosure identifies the position of the contact point using current control.

Figure 3:
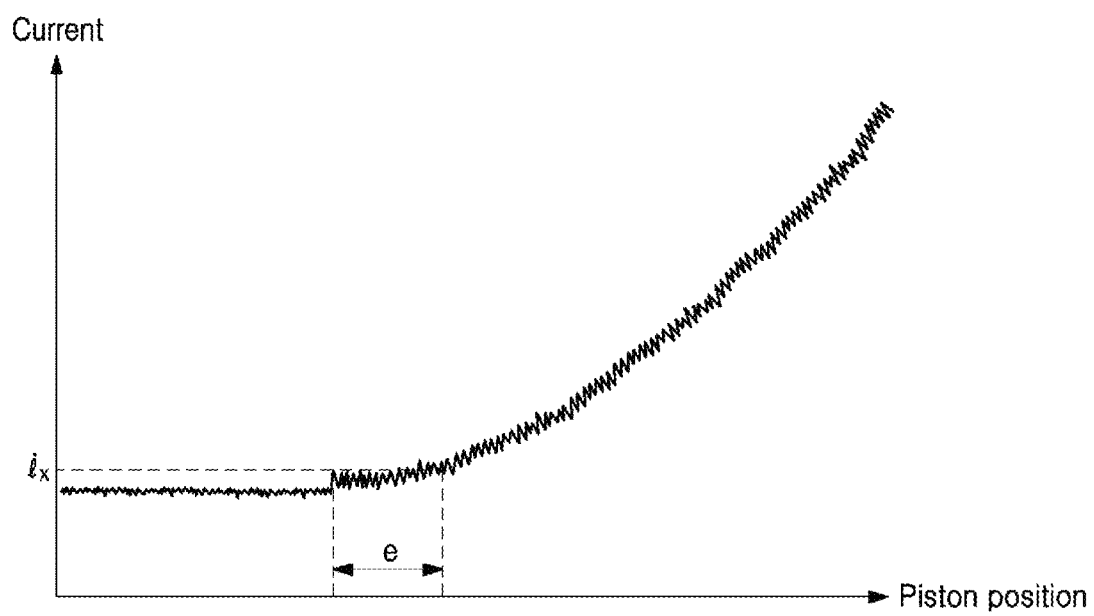
FIG. 3 is a graph in which current is measured according to an operating distance of a brake pad.

FIG. 3 is a graph in which current is measured according to the operating distance of the brake pad.

Referring to FIG. 3, the intensity of current flowing through the motor 120 is increased in proportion to the magnitude of the clamping force. Since the measured value of the current sensor has a large error range, it is difficult to precisely estimate the clamping force. Referring to FIG. 3, when a case where the current sensor detects the value of is determined as the contact point, a large error range e occurs due to the measurement noise of the current sensor. The current detection unit 180 according to an embodiment of the present disclosure includes a current sensor that measures current flowing through the motor 120, and a low pass filter (not shown) that eliminates noise from the current value measured using the current sensor. When only the current sensor is used, a first current value may be measured at a plurality of positions of the piston 131 due to the measurement noise. The contact point calculation unit 165 detects the first position using the current value in which noise is reduced by using the low pass filter.

Figure 4:
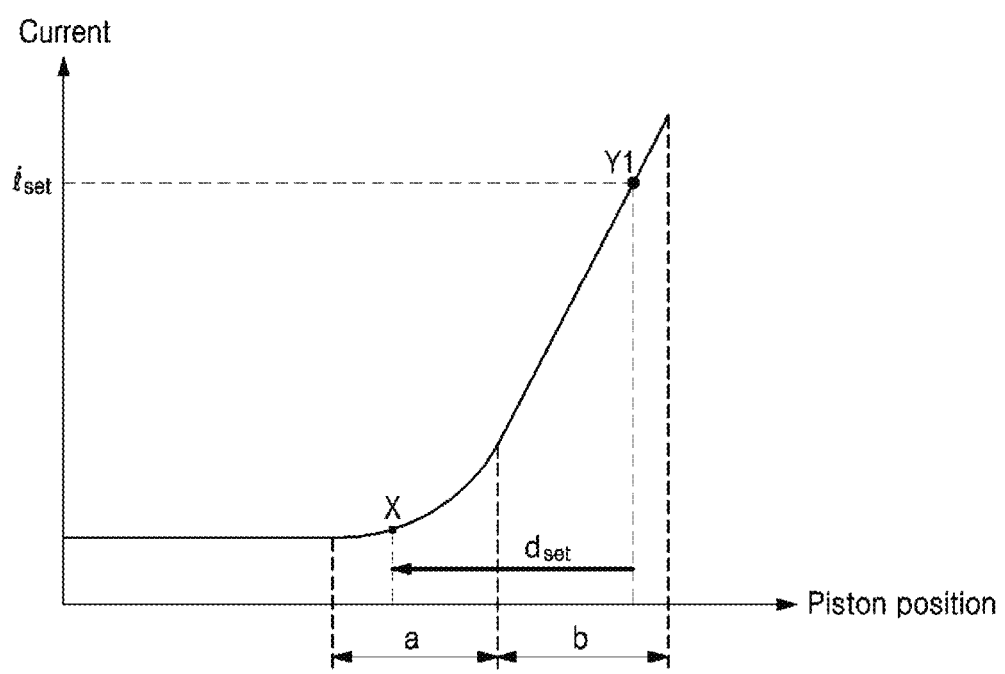
FIG. 4 is a graph illustrating a method of estimating the position of a contact point.

FIG. 4 is a graph illustrating a method of estimating the position of the contact point.

Referring to FIG. 4, the horizontal axis of the graph represents the position of the piston 131, while the vertical axis thereof represents the value of current flowing through the motor 120. As it proceeds to the right on the horizontal axis of the graph, a gap g (see FIG. 1) between the brake pad 140 and the wheel disc 150 is reduced.

The current value of the motor 120 is maintained at a substantially constant value in a section before the contact point X, but the current value is non-linearly increased in a non-linear section a shown in FIG. 4 after the contact point. If the operating distance is further increased past the non-linear section a, the current value is linearly increased in a linear section b shown in FIG. 4. Here, the linear section b refers to a section in which the current value detected using the current detection unit 180 is linearly changed within a predetermined error range for the position of the piston 131.

The position of the piston 131 when the current detection unit 180 detects the first current value $i_{set}$ is defined as a first position Y1. The first current value $i_{set}$ that is a preset value may be a current value on the linear section b. When the first current value $i_{set}$ is the current value on the linear section b, the error range occurring in the linear section b is narrower than the error range e occurring in the non-linear section a, so that the contact point can be more accurately calculated.

The control unit 160 includes a processor (e.g., computer, microprocessor, CPU, ASIC, circuitry, logic circuits, etc.) and an associated non-transitory memory storing software instructions which, when executed by the processor, provides the functionalities of all or some of a hysteresis data storage unit 161, a calculation unit 162, a past state data storage unit 163, a transition section function data generating unit 164, a contact point calculation unit 165, a braking force calculation unit 166, and a motor controller 167. Herein, the memory and the processor may be implemented as separate semiconductor circuits. Alternatively, the memory and the processor may be implemented as a single integrated semiconductor circuit. The processor may embody one or more processor(s).

The contact point calculation unit 165 calculates the contact point X based on the first position Y1 that is the position of the piston 131 when the first current value is detected using the current detection unit 180. The contact point calculation unit 165 calculates a second position spaced apart from the first position Y1 by a preset distance $d_{set}$ in a direction away from the wheel disc 150 as the contact point X. The value of the preset distance $d_{set}$ that is an experimentally measured value may vary depending on the specification of the electro-mechanical brake. The control unit 160 may determine the relative positions of the brake pad 140 and the wheel disc 150 and the size of an air gap using the position sensor, based on the determined contact point X.

The motor controller 167 drives the motor 120 for a preset time when the vehicle is stopped, thus moving the piston 131 toward the wheel disc 150. The motor controller 167 may drive the motor 120 for a preset time when the vehicle is parked and the door of the vehicle is opened, thus moving the piston 131 toward the wheel disc 150. If the door is opened while the vehicle is parked, the motor controller 167 may drive the motor 120 at a preset angular speed for a preset time. Based on data on the current value for the position of the piston 131 collected for a preset time, the contact point calculation unit 165 may calculate the contact point X.

When a driver presses a brake pedal before the preset time has elapsed, the motor controller 167 drives the motor 120 at a preset angular speed for a preset time after the door of the vehicle is opened, thus moving the piston 131 toward the wheel disc 150. The motor controller 167 controls the motor 120 to generate a braking force corresponding to a braking signal immediately after a preset time has elapsed.

Figure 5:
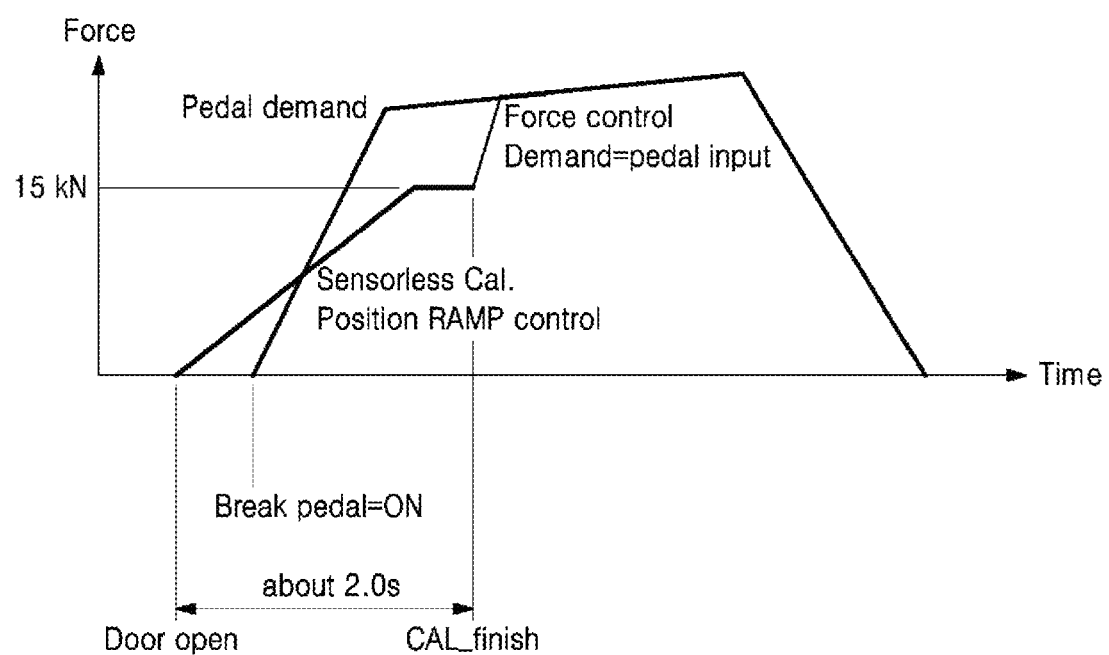
FIG. 5 is a graph illustrating a motor control time for detecting the contact point.

FIG. 5 is a graph illustrating a motor control time for detecting the contact point.

Referring to FIG. 5, if the door is opened while the vehicle is stopped, the motor controller 167 drives the motor 120 at a predetermined angular speed for about 2 seconds to move the piston 131 toward the wheel disc 150. In the present disclosure, an operation in which the motor controller 167 drives the motor 120 at a predetermined angular speed for a preset time is referred to as ramp driving. The contact point calculation unit 165 identifies the contact point based on the current value data for the position of the piston 131 acquired by the ramp driving.

If a driver presses the pedal before the ramp driving is finished, the motor controller 167 controls the motor 120 to generate the braking force corresponding to the braking signal that is input using the brake pedal immediately after the ramp driving is finished. The ramp driving is performed while the vehicle is parked. Thus, even if the braking force that does not correspond to the braking signal generated by the driver is generated during the ramp driving, the driver cannot see that the braking force that does not correspond to the braking signal is generated.

The motor controller 167 controls the motor 120 so that the electro-mechanical brake generates a demand braking force based on the braking force calculated by the braking force calculation unit 166.

Figure 6:
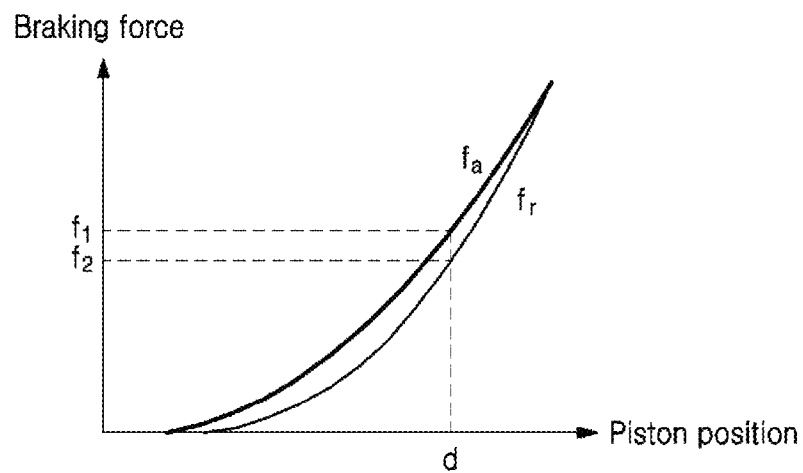
FIG. 6 is a graph illustrating the magnitude of braking force according to the position and moving direction of a piston.

FIG. 6 is a graph illustrating the magnitude of the braking force according to the position and moving direction of the piston.

Referring to FIG. 6, the horizontal axis of the graph represents the position of the piston 131. When the piston 131 is at the lowest point of the stroke, the position of the piston 131 is set to 0. The vertical axis of the graph represents the braking force. The braking force is not determined only by the position of the piston 131. Even if the piston 131 is at the same position, the braking force when the piston 131 moves toward the wheel disc 150 is different from the braking force when the piston 131 moves away from the wheel disc 150. Therefore, in order to accurately estimate the braking force, it is necessary to consider the position of the piston 131 as well as the moving path of the piston 131. In the present disclosure, a function for a rising section in which the braking force is increased as the piston 131 moves toward the wheel disc 150 is referred to as a rising section function $f_a$ (see FIG. 6), and a function for a falling section in which the braking force is reduced as the piston 131 moves away from the wheel disc 150 is referred to as a falling section function $f_a$ (see FIG. 6).

Figure 7:
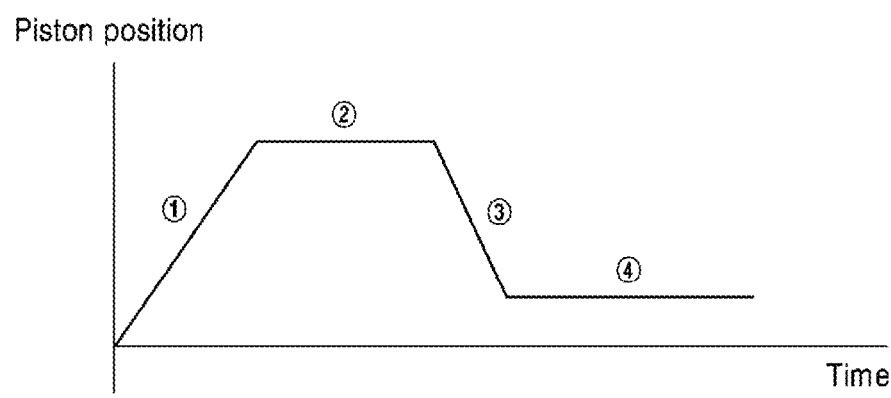
FIG. 7 is a graph illustrating a process of determining a function that the electro-mechanical brake according to an embodiment of the present disclosure follows to calculate braking force.

FIG. 7 is a graph illustrating a process of determining a function that the electro-mechanical brake according to an embodiment of the present disclosure follows to calculate the braking force.

Referring to FIG. 7, the vertical axis of the graph of FIG. 7 represents the position of the piston 131. When the piston 131 is at the lowest point of the stroke, the position of the piston 131 is set to 0. The horizontal axis of the graph represents an elapsed time.

The moving state of the piston 131 of the electro-mechanical brake may be divided into four states. In state ①, the piston 131 moves toward the wheel disc 150. That is, a differential value of the position of the piston 131 with respect to time is a positive number. In state ③, the position of the piston 131 with time is reduced. That is, the differential value of the position of the piston 131 with respect to time is a negative number. In state ② and state ④, the position of the piston 131 is not changed. In other words, the differential value of the position of the piston 131 with respect to time is 0. State ② and state ④ are divided depending on the moving state of the piston 131 just before the piston 131 is stopped. If the differential value of the position of the piston 131 is the positive number before the piston 131 is stopped, this may be defined as state ②. If the differential value of the position of the piston 131 is the negative number before the piston 131 is stopped, this may be defined as state ④. When the moving state of the piston 131 is state ① or state ②, the braking force for the position of the piston 131 is determined according to the rising section function. When the moving state of the piston 131 is state ③ or state ④, the braking force for the position of the piston 131 is determined according to the falling section function.

The hysteresis data storage unit 161 may be a storage medium or a memory that stores data on the rising section function $f_a$ (see FIG. 6) for the rising section, and data on the falling section function $f_r$ (see FIG. 6) for the falling section.

The calculation unit 162 calculates the differential value of the position of the piston 131 with respect to time. The past state data storage unit 163 may be also a storage medium or a memory that stores data on a preceding section corresponding to the position of a preceding piston 131.

The braking force calculation unit 166 may calculate the braking force based on the differential value of the position of the piston 131 and data on the preceding section. The braking force calculation unit 166 follows the rising section function to calculate the braking force when the differential value of the position of the piston 131 with respect to time is the positive number. When the differential value of the position of the piston 131 with respect to time is the negative number, the braking force calculation unit follows the falling section function to calculate the braking force. If the differential value of the position of the piston 131 with respect to time is 0 and the section corresponding to the position of the preceding piston 131 is the rising section, the braking force calculation unit follows the rising section function to calculate the braking force. If the differential value of the position of the piston 131 with respect to time is 0 and the section corresponding to the position of the preceding piston 131 is the falling section, the braking force calculation unit follows the falling section function to calculate the braking force. Thus, the braking force may be calculated using an appropriate function according to the moving state of the piston 131. By calculating the braking force using the appropriate function, the braking force may be more accurately calculated.

Figure 8A:
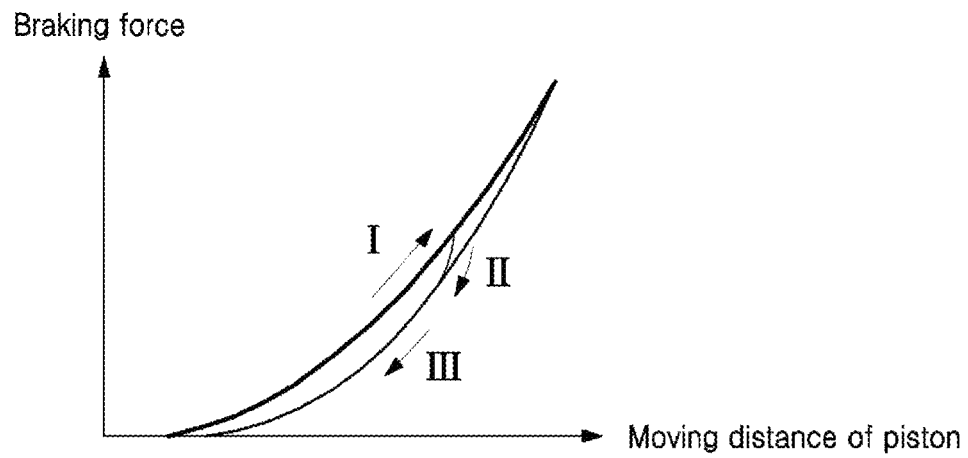
FIGS. 8A and 8B are graphs illustrating a transition section function according to an embodiment of the present disclosure.
Figure 8B:
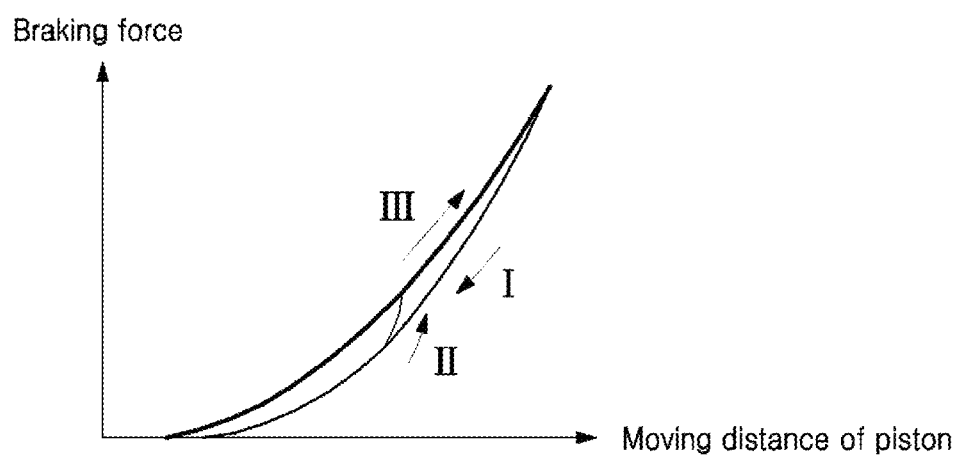

FIGS. 8A and 8B are graphs illustrating a transition section function according to an embodiment of the present disclosure.

Referring to FIGS. 8A and 8B, when the moving direction of the piston 131 is switched at a position other than a highest point or a lowest point of the braking force, the actual braking force is continuously changed along a path II that follows the transition section function. Here, the transition section means a section in which the braking force is transferred from any one of the rising section and the falling section to another section as the moving direction of the piston 131 is changed.

FIG. 8A is a graph showing a path in which the braking force is changed according to the moving distance of the piston when the piston moves toward the wheel disc and then moves in the direction away from the wheel disc.

When the piston moves toward the wheel disc and then moves in the direction away from the wheel disc, the magnitude of the braking force according to the moving distance of the piston is changed along the path I while the piston moving toward the wheel disc, along the path II in the transition section after the direction is changed, and along the path III after the transition section.

FIG. 8B is a graph showing a path in which the braking force is changed according to the moving distance of the piston when the piston moves in the direction away from the wheel disc and then moves toward the wheel disc.

When the piston moves in the direction away from the wheel disc and then moves toward the wheel disc, the magnitude of the braking force according to the moving distance of the piston is changed along the path I while the piston moving in the direction away from the wheel disc, along the path II in the transition section after the direction is changed, and along the path III after the transition section.

The function value of the transition section function has a value that is greater than the function value of the falling section function $f_r$ (see FIG. 6) and is smaller than the function value of the rising section function $f_a$ (see FIG. 6). If the braking force calculation unit 166 calculates the braking force only by the rising section function $f_a$ (see FIG. 6) or the falling section function $f_r$ (see FIG. 6), a difference occurs between the braking force calculated using the braking force calculation unit 166 in the transition section and an actual braking force. Therefore, the electro-mechanical brake according to an embodiment of the present disclosure includes a transition section function data generating unit 164 that generates transition section function data.

The transition section function data generated by the transition section function data generating unit 164 may be determined based on the wear amount of the brake pad 140.

The transition section function data generating unit 164 according to an embodiment of the present disclosure may include a memory (not shown) that stores the transition section function data on the transition section. After the transition section function data is experimentally obtained, the data may be converted into a Look-Up Table (LUT) form and stored in the memory. The function data stored in the memory is called and used to calculate the braking force. On the other hand, the transition section function data generating unit 164 according to another embodiment of the present disclosure includes a transition section function data calculation unit (not shown) that calculates the transition section function based on the position of the piston 131 in real time to generate a function.

The braking force calculation unit 166 calculates the braking force based on the position of the piston 131.

When the piston 131 moves toward the wheel disc 150, the braking force may be calculated by putting the position of the piston 131 into the rising section function $f_a$ (see FIG. 6). However, when the piston 131 moves away from the wheel disc 150 and then moves toward the wheel disc 150, the braking force is calculated using the transition section function in the position section of the piston 131 in which the transition section function value is smaller than the value of the rising section function $f_a$ (see FIG. 6). In other words, when the moving direction of the piston 131 is changed from the direction away from the wheel disc 150 to the direction towards the wheel disc 150, the braking force calculation unit 166 follows a function with a smaller function value among the transition section function and the rising section function $f_a$ (see FIG. 6) to calculate the braking force.

When the piston 131 moves in the direction away from the wheel disc 150, the braking force may be calculated by putting the position of the piston 131 into the falling section function $f_r$ (see FIG. 6). However, when the piston 131 moves toward the wheel disc 150 and then moves away from the wheel disc 150, the braking force is calculated using the falling section function $f_r$ (see FIG. 6) in the position section of the piston 131 in which the transition section function value is smaller than the value of the falling section function $f_r$ (see FIG. 6). In other words, when the moving direction of the piston 131 is changed from the direction of the wheel disc 150 to the direction away from the wheel disc 150, the braking force calculation unit 166 follows a function with a larger function value among the transition section function and the falling section function $f_r$ (see FIG. 6) to calculate the braking force. By configuring the electro-mechanical brake device in this way, it is possible to accurately estimate the braking force even when the moving direction of the piston 131 is changed.

Figure 9:
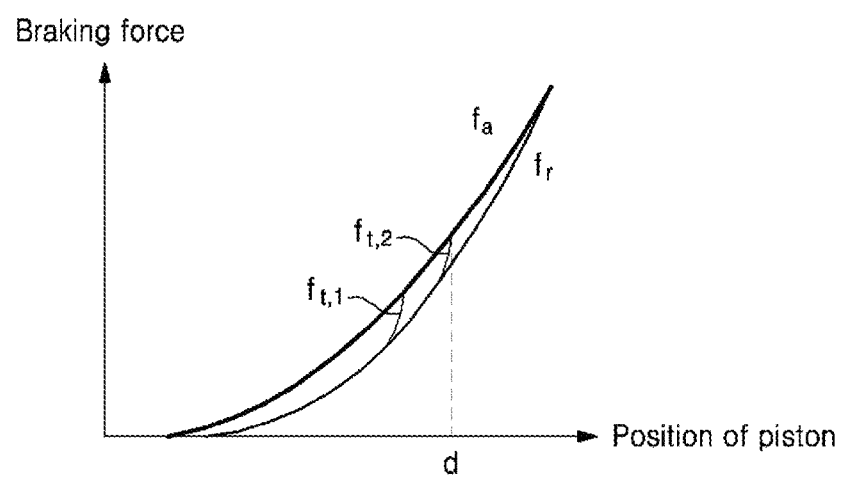
FIG. 9 is a graph illustrating a rising section function, a falling section function, and a transition section function according to an embodiment of the present disclosure.

FIG. 9 is a graph illustrating the rising section function, the falling section function, and the transition section function according to an embodiment of the present disclosure.

Referring to FIG. 9, by reflecting the hysteresis characteristics of the braking force according to the position of the piston 131, the transition section functions $f_{t1}$ and $f_{t2}$ may have a positive slope. At any position of the piston 131, the differential value of the transition section functions $f_{t1}$ and $f_{t2}$ may be greater than the differential value of the rising section function $f_a$ (see FIG. 9) and the differential value of the falling section function $f_r$ (see FIG. 9).

In order to more easily generate the transition section functions $f_{t1}$ and $f_{t2}$, the transition section functions $f_{t1}$ and $f_{t2}$ may be linear functions with positive slopes. A plurality of transition section functions $f_{t1}$ and $f_{t2}$ present between the rising section and the falling section may be linear functions having the same slope.

The control unit 160 according to an embodiment of the present disclosure determines the wear degree of the brake pad 140 by measuring a distance between the contact point and the lowest point of the stroke of the piston 131.

Figure 10:
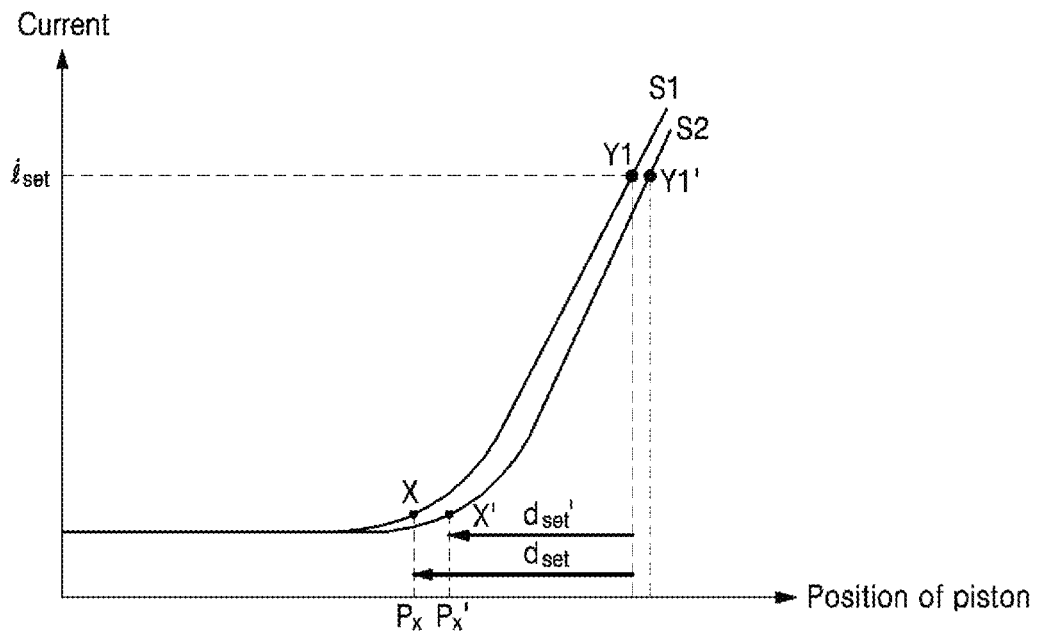
FIG. 10 is a graph illustrating a change in braking force function according to the position of the piston when the brake pad is worn out.
Figure 11A:
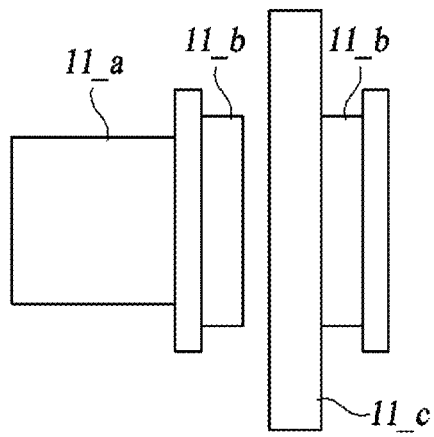
FIGS. 11A, 11B and 11C are schematic views illustrating the configuration of a conventional electro-mechanical brake.
Figure 11B:
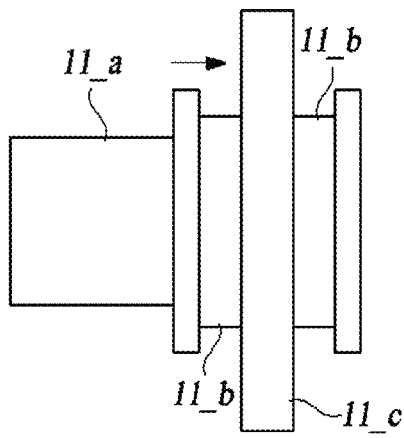
Figure 11C:
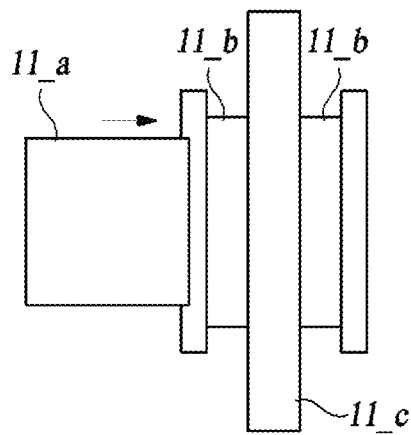

FIG. 10 is a graph illustrating a change in braking force function according to the position of the piston when the brake pad is worn out.

Referring to FIG. 10, S1 is a graph showing the intensity of current according to the position of the piston 131. S2 is a graph showing the intensity of current according to the position of the piston 131 when the brake pad 140 is further worn compared to that of S1. In FIG. 10, the hysteresis characteristics are not shown so as to clearly represent the graph between the position of the piston 131 and the braking force according to the wear degree of the brake pad 140. However, the following description is applied to all of the rising section function $f_a$ (see FIG. 6), the transition section function, and the falling section function $f_r$ (see FIG. 6).

If the brake pad 140 is worn, the contact point moves from X to X'. That is, the contact point moves toward the wheel disc 150. As the brake pad 140 is worn, the rigidity of the brake pad 140 increases, so that the slope increases in the linear section b (see FIG. 5). A first check point is moved from Y1 to Y1'. Thus, a preset distance, which is a distance from the first position to the second position, should be differently set from to $d_{set}$ and $d_{set}'$. That is, the preset distance should be differently set depending on the wear degree of the brake pad 140.

The control unit 160 may measure the absolute distance of the contact point X, and determine that the wear degree of the brake pad 140 increases as the absolute distance increases. Here, the absolute distance of the contact point X means the operating distance from the lowest point of the stroke to the contact point. The control unit 160 may find and apply the value of $d_{set}'$ according to the wear degree of the brake pad 140. The variation of $d_{set}$ according to the wear degree of the brake pad 140 may be experimentally obtained, converted into the Look-Up Table (LUT) form, and stored in the memory of the control unit 160. That is, the control unit 160 may calculate the absolute distance of the brake pad 140 to determine the wear degree of the brake pad 140, and convert the value of $d_{set}$ into the value of $d_{set}'$ to estimate the contact point X' of the worn brake pad 140.

As the brake pad 140 is worn, the differential value of the braking force function according to the position of the piston 131 is increased at any point of the piston 131. The electro-mechanical brake according to an embodiment of the present disclosure determines the rising section function $f_a$ (see FIG. 6), the transition section function, and the falling section function $f_r$ (see FIG. 6) based on the wear amount of the brake pad 140. The hysteresis data storage unit 161 according to an embodiment of the present disclosure stores data on a plurality of rising section functions $f_a$ (see FIG. 6) determined based on the wear amount of the brake pad 140 and data on a plurality of falling section functions $f_p$ (see FIG. 6) determined based on the wear amount of the brake pad 140.

The wear amount of the brake pad 140 may be determined by measuring the distance from the lowest point of the stroke of the piston 131 to positions $P_x$ and $P_{x'}$ of the piston 131 when the brake pad 140 starts to contact the wheel disc 150.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof

What is claimed is:

1. An electro-mechanical brake configured such that a piston pulls a brake pad toward a wheel disc by driving a motor, the electro-mechanical brake comprising:
   a hysteresis data storage unit storing rising-section function data on a rising section in which braking force increases as the piston moves toward the wheel disc, and falling-section function data on a falling section in which the braking force decreases as the piston moves away from the wheel disc;

a position detection unit detecting a position of the piston;

a calculation unit calculating a differential value of the detected position of the piston with respect to time;

a past state data storage unit storing data on a preceding section corresponding to a preceding piston position; and a braking force calculation unit calculating the braking force based on the differential value of the piston position and the data on the preceding section.

2. The electro-mechanical brake of claim 1, wherein the braking force calculation unit calculates the braking force by following the rising section function when the differential value of the piston position with respect to the time is a positive number.

3. The electro-mechanical brake of claim 1, wherein the braking force calculation unit calculates the braking force by following the rising section function when the differential value of the piston position with respect to the time is zero and a section corresponding to the preceding piston position is the rising section.

4. The electro-mechanical brake of claim 1, wherein the braking force calculation unit calculates the braking force by following the falling section function when the differential value of the piston position with respect to the time is zero and a section corresponding to the preceding piston position is the falling section.

5. The electro-mechanical brake of claim 1, wherein the braking force calculation unit calculates the braking force by following the falling section function when the differential value of the piston position with respect to the time is a negative number.

* * * * *